UNITED STATES PATENT OFFICE.

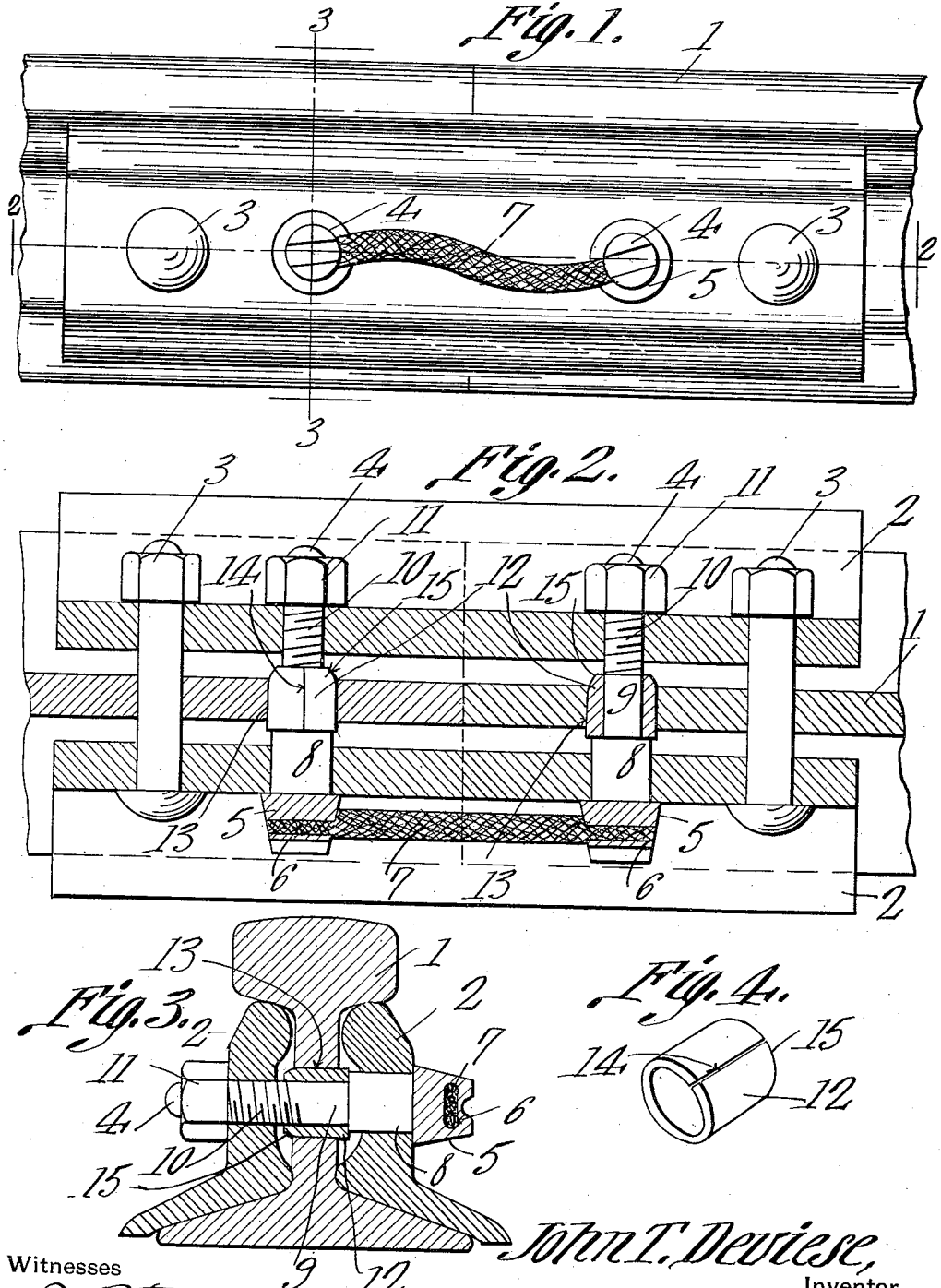

JOHN T. DEVIESE, OF HILLTOP, WEST VIRGINIA, ASSIGNOR OF ONE-HALF TO WILLIAM E. DEEGANS, OF GLEN JEAN, WEST VIRGINIA, ONE-FOURTH TO LEWIS P. JOHNSON, OF LAFOLLETTE, TENNESSEE, AND ONE-FOURTH TO WILLIAM S. JOHNSON, OF MOUNT HOPE, WEST VIRGINIA.

RAIL-BOND.

1,017,285.      Specification of Letters Patent.      Patented Feb. 13, 1912.

Application filed May 31, 1911. Serial No. 630,321.

*To all whom it may concern:*

Be it known that I, JOHN T. DEVIESE, a citizen of the United States, residing at Hilltop, in the county of Fayette and State of West Virginia, have invented a new and useful Rail-Bond, of which the following is a specification.

This invention relates to improvements in rail bonds, the primary object of the invention being the provision of a rail bond, adapted to be carried by the nearer bolts of a fish plate, thereby reducing the length of the bond, said bolts being peculiarly constructed or bored in their tapered head to receive the bond wire and provided with split tapered sleeves upon the body points thereof, whereby when the bolts are secured in position the said sleeve will provide a better electrical and mechanical connection between the bolts and the rail.

Another object of the invention is the provision of a tapered head bolt for securing the fish plates of rails together, said bolts being provided with a swaging or wedging cone or split sleeve thereon, whereby a better mechanical and electrical connection may be had to the rail, the tapered head being further provided with apertures or slots for the reception of a flexible bonding wire, thus providing a means whereby the wire is properly held in position, and by reason of the employment of the fish plate bolts, a short bonding wire may be used.

With the foregoing and other objects in view which will appear as the description proceeds, the invention resides in the combination and arrangement of parts and in the details of construction, it being understood that changes in the precise embodiment of invention herein disclosed can be made within the scope of what is claimed without departing from the spirit of the invention.

In the drawings—Figure 1 is a side elevation of two meeting joints of a rail and the fish plate, with a bond attached thereto. Fig. 2 is a longitudinal section taken on line 2—2 of Fig. 1. Fig. 3 is a cross section taken on line 3—3 of Fig. 1. Fig. 4 is a perspective of the swaging sleeve carried by the bonding bolts.

Referring to the drawings, the numeral 1 designates the rails and 2 the fish plates. The fish plates are connected in the usual manner by means of the bolts 3 and of the bonding bolt 4, said bonding bolts 4 being provided with the tapered head 5 with the slots 6 therethrough, the bonding wire 7 having its terminals placed in said slots or apertures through the cone heads of the bolts, and the metal thereof battered down, so as to wedge or swage the terminals of the wire within the tapered or cone heads of the bolts.

By utilizing the nearer bolts of the fish plates and the respective ends of the rails, it will be seen that the bonding wire is much shorter than usual. These bonding bolts are provided with an elongated portion 8 which enters one of the fish plates and prevents the bolts from turning, and with the reduced smooth portion 9 and the threaded portion 10, for the reception of the nut 11. Upon the smooth portion of the bonding bolts are mounted the split sleeves 12, which are adapted to abut the opening 13 in the web of the rail, and as the bolts are drawn tightly to secure the fish plates upon the rails, the split portion 14 of said swaging sleeve 12, is forced apart so that a better mechanical and electrical connection is made between the bolts and the web of the rail. By producing the sleeve 12 with the tapered inner end 15 the swaging action upon the web of the rail caused by the drawing of the bolts and their nuts 11, produces a better electrical connection with the rail and consequently with the bond 7.

In applying this rail bond, it is evident that the two bolts carrying the bond 7 may have the bond secured thereto before being inserted in the fish plates and web of the rails, the slots being provided in the cone heads of the bolts by drilling and after the terminal of the bond is placed therein, the metal above the opening in the ends of the cones of the bolt is swaged or hammered down, so as to provide a tight connection for the terminals and at the same time provide a good electrical bond.

What is claimed is:

1. The combination with the abutting ends and the fish plates thereof, of an electrical bond, comprising two bolts passing through said fish plates and the rails, each of said bolts being provided with tapered heads with transverse channels therethrough, a bonding wire passing through said channels, and held in place by the wedging of the metal at the top of the heads, and a tapered sleeve carried upon each bolt and adapted to be swaged into close contact with the web of the rail.

2. The combination with the abutting ends of the rails and the fish plates, of an electrical bond therefor, comprising two bolts adapted to secure the fish plates in place, each one of said bolts being provided with openings through the heads thereof, an electrical bond having its terminals connected in each opening of the respective heads of the bolts, and a removable swaging sleeve mounted upon each bolt and adapted to engage the web of the rail when the bolts are holding the fish plates in place.

3. The combination with the abutting rails and fish plates, of an electrical bond therefor, comprising two bolts adapted to secure the fish plates to the rails, each one of said bolts being provided with a tapered head with a transverse channel therethrough, a metallic bond mounted in the transverse channel of the said bolts and swaged therein by the metal of the bolts, a split sleeve mounted upon the bolts and adapted to fit within the web of the rail, and a nut upon each bolt for drawing the bolt tightly so as to wedge the sleeve into close contact with the rail and hold the fish plates in place.

In testimony that I claim the foregoing as my own, I have hereto affixed my signature in the presence of two witnesses.

JOHN T. DEVIESE.

Witnesses:
F. J. MALONE,
ROBERT ESSEX.

Copies of this patent may be obtained for five cents each, by addressing the "Commissioner of Patents, Washington, D. C."